US008001422B1

(12) United States Patent
Sun et al.

(10) Patent No.: US 8,001,422 B1
(45) Date of Patent: Aug. 16, 2011

(54) SHADOW TESTING SERVICES

(75) Inventors: Vanessa Y. Sun, Seattle, WA (US); Neeraj Agrawal, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 526 days.

(21) Appl. No.: 12/164,805

(22) Filed: Jun. 30, 2008

(51) Int. Cl.
*G06F 11/00* (2006.01)

(52) U.S. Cl. .................. 714/25; 714/28; 714/31; 714/37

(58) Field of Classification Search .................... 714/25, 714/28, 31, 37
See application file for complete search history.

(56) References Cited

U.S. PATENT DOCUMENTS

| | | | |
|---|---|---|---|
| 6,263,461 B1 * | 7/2001 | Ayres et al. | 714/718 |
| 6,556,983 B1 * | 4/2003 | Altschuler et al. | 706/55 |
| 6,557,147 B1 * | 4/2003 | Lee et al. | 716/106 |
| 6,857,196 B2 * | 2/2005 | Dalrymple | 33/512 |
| 7,315,865 B1 * | 1/2008 | Jernigan, IV | 707/754 |
| 7,355,603 B2 * | 4/2008 | Donovan et al. | 345/582 |
| 7,831,807 B1 * | 11/2010 | Johnson et al. | 712/211 |
| 7,840,944 B2 * | 11/2010 | Brunswig et al. | 717/124 |
| 2003/0156549 A1 * | 8/2003 | Binder et al. | 370/252 |
| 2004/0078556 A1 * | 4/2004 | Spracklen | 712/223 |
| 2004/0205570 A1 * | 10/2004 | Tonomura | 715/513 |
| 2005/0268165 A1 * | 12/2005 | Betts et al. | 714/18 |
| 2007/0005739 A1 * | 1/2007 | Carey et al. | 709/223 |
| 2007/0089086 A1 * | 4/2007 | Ortloff | 717/101 |
| 2007/0189181 A1 * | 8/2007 | Kirk et al. | 370/252 |
| 2008/0097960 A1 * | 4/2008 | Dias et al. | 707/2 |
| 2008/0211827 A1 * | 9/2008 | Donovan et al. | 345/582 |
| 2009/0007220 A1 * | 1/2009 | Ormazabal et al. | 726/1 |

* cited by examiner

*Primary Examiner* — Scott T Baderman
*Assistant Examiner* — Loan Truong
(74) *Attorney, Agent, or Firm* — Kilpatrick Townsend & Stockton LLP

(57) ABSTRACT

A new service, or new version of an existing service, can be tested using actual production requests and services. A request received by a production service, along with the response generated by the production service, is forwarded to a shadow service. The shadow service forwards the request to the new service, which generates a test response and sends the test response back to the shadow service. The shadow service utilizes a comparison engine operable to compare the responses for significant differences. Any significant differences can be logged, reported on, or added to statistics for the new service being tested.

25 Claims, 6 Drawing Sheets

SHADOW TESTING SERVICES

BACKGROUND

An increasing amount of applications and functionality is being offered in the form of services over various networks. By providing functionality as a service, a user or customer can simply subscribe to or otherwise access the functionality, while allowing someone else to maintain, host, update, and otherwise provide the functionality as a service. When developing or providing such a service, it is desirable to test the functionality to ensure that any errors in the code are minimized to within an acceptable range. While no service is going to be accurate 100% of the time, owing to factors such as availability and hardware issues in addition to any coding errors, an accuracy of at least 99% can be acceptable in certain cases. A problem with testing the functionality before putting the service into production, however, is that the service is not able to be easily be tested in a production environment. Services often are tested by a testing team in a development and/or testing environment, but test cases developed by the testing team generally address known or expected issues, and cannot anticipate how users might actually interact with the service. Unfortunately, it is not practical to test the service in an actual production environment as users can experience an unacceptable number of errors, and in some cases these errors can affect other portions of a system, network, or enterprise.

Further, when providing functionality in the form of services, the service provider has little control over which version of the service a user or customer is using. While a service provider can simply stop supporting previous versions of a service, such an approach can be undesirable from a business standpoint. For example, if a user has a data file created by previous version 1 of a service, but that data file is not compatible with current version 10 of a service, then the user might have no way to easily recover that data. Further, users might migrate to other services that do not require frequent updating, etc. It thus can be desirable in certain situations to ensure that each new version of a service is backwards compatible with at least some of the previous versions. Again, test cases developed by a testing team to test a new service generally address known or expected issues, and cannot anticipate how users might actually interact with the service.

One previous solution was to allow developers to test their services in a testing environment. This is not optimal for a number of reasons, including the fact that it is necessary to provide a second environment that mirrors the production environment, which can require a significant amount of hardware, maintenance, etc., and can thus be very expensive. Another problem is that the testing of multiple services in the same environment can lead to problems when an error is detected, as it can take a significant amount of time to determine which service caused the error. Further, even when the error is pinpointed, it will take some time for that service to correct for the error, which can lead to delay in testing other services affected by the error.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to testing, developing, and managing services and other such functionality in an electronic environment. Systems and methods in accordance with various embodiments allow services, such as new or updated services under development or in the testing phase, to run behind or "shadow" the services that are currently in production. The current services can dispatch received requests, as well as responses generated for those requests, to these shadow services in a one-way call. Such an approach allows these shadow services to test functionality in a "real" production environment with real production traffic and requests, without causing any production stability, latency, or availability risk. The shadow services can perform functions such as regression/compatibility testing, performance evaluation, stress testing etc. Such an approach provides a safe mechanism to expose the new or updated services to the production environment, and to enable the services to process real requests, before those shadow services are actually launched into production. Such an approach also can be used to provide quality assurance (QA) test coverage and traffic simulation for services with little or no risk to the production environment. Such an approach can also provide an automatic test case generator to evaluate aspects such as functionality and scalability. Such an approach also allows a service to be tested to determine whether the service is able to handle a large amount of traffic in a production-type setting.

Figure 1:
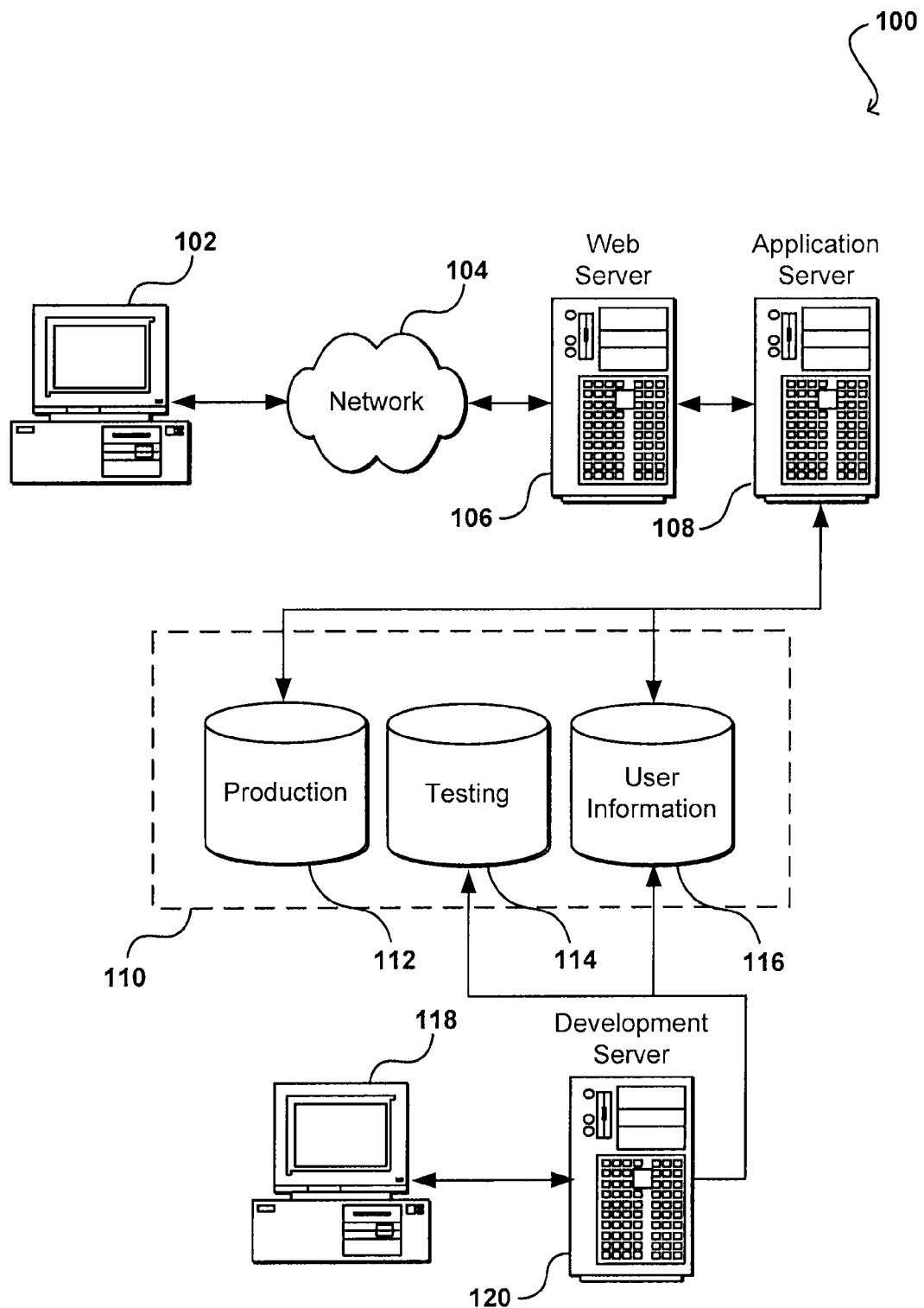
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Aspects of the various embodiments can be utilized on the production side or the development side. These aspects also can be used in other environments, where there may not be such a separation, or where there may be other portions such as a dedicated test server (not shown) or other such devices. Arrangements for testing development and production code are known in the art and will not be discussed herein in detail.

As discussed, when providing a new service, or a new version of an existing service, it can be desirable to perform the testing using actual production requests instead of a set of test cases that only test certain aspects of the service. It also can be desirable in various embodiments to provide such testing functionality without having to put customer data at risk, or to have to maintain a full second testing environment that mirrors the production environment. Further still, it can be desirable in at least some embodiments to be able to perform such testing without having to rely upon other services or functionality that is also being tested.

Approaches in accordance with various embodiments address these and other desires by implementing a testing environment that is able to leverage information and functionality of the production environment without otherwise affecting components or data of the environment. A "read-only" type environment is implemented in one embodiment by forwarding user requests and corresponding production responses to a "shadow" service, without implementing a listener or other mechanism in the production environment for receiving responses back from the shadow service. Another implementation logs the requests, with or without the corresponding production responses, in order to utilize production information outside the production environment, such as for use with a test case generator.

Figure 2:
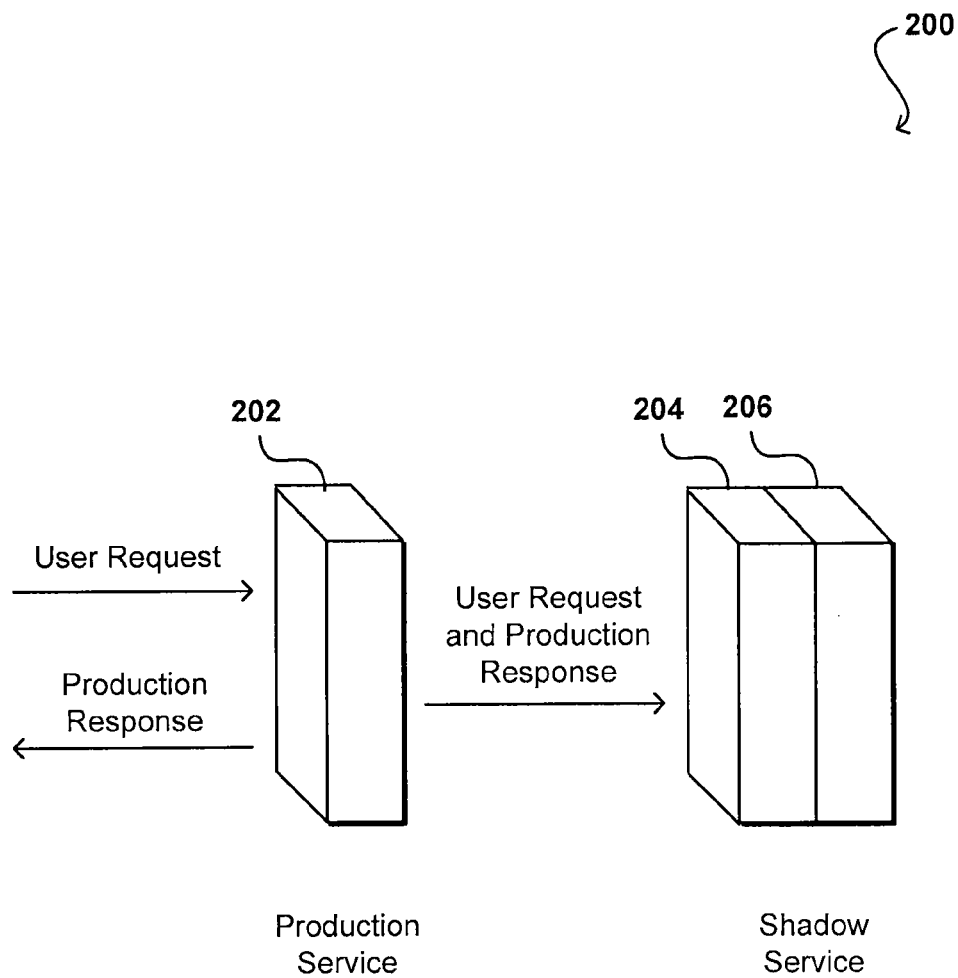
FIG. 2 illustrates a messaging flow that can be used in accordance with one embodiment.

FIG. 2 illustrates a call flow 200 for such an approach that can be used in accordance with one embodiment. This approach allows for the testing of a new or different service, or new version of an existing service, using real requests from the production environment. Further, the approach provides the actual response from the production environment, which allows testing not only for accuracy, but also for compatibility with the version of the service (where applicable) currently in production. Such an approach can further rely on the actual back-end services used in production.

As shown in FIG. 2, a service 202 (referred to herein as a "production service") is running in a production environment that is able to receive a request from a user, directly or indirectly, process information needed to respond to at least a portion of the request, and return a response to the user, directly or indirectly. In many cases, a number of different services may be used to serve a request, and the flow of requests and responses can be configured accordingly. Another service 206, or another version of the same service (referred to herein as the "test service"), is running in a testing, development, or similar environment. This test service is able to process requests directly submitted by a test engineer, quality assurance manager, or similar user.

Another component of the implementation of FIG. 2 is what is referred to herein as a shadow service 204. A shadow service in this embodiment is not a stand-alone service, but is a service running in what is referred to herein as "shadow mode," meaning the shadow service is able to receive requests and/or responses from other services, then independently process the request without returning any results to the customer or other source of the request. While the shadow service is shown to be in the test environment with the test service 206, in other embodiments the shadow service is a thin layer that sits inside the production service 202, or outside the production service but within the production environment.

Figure 3:
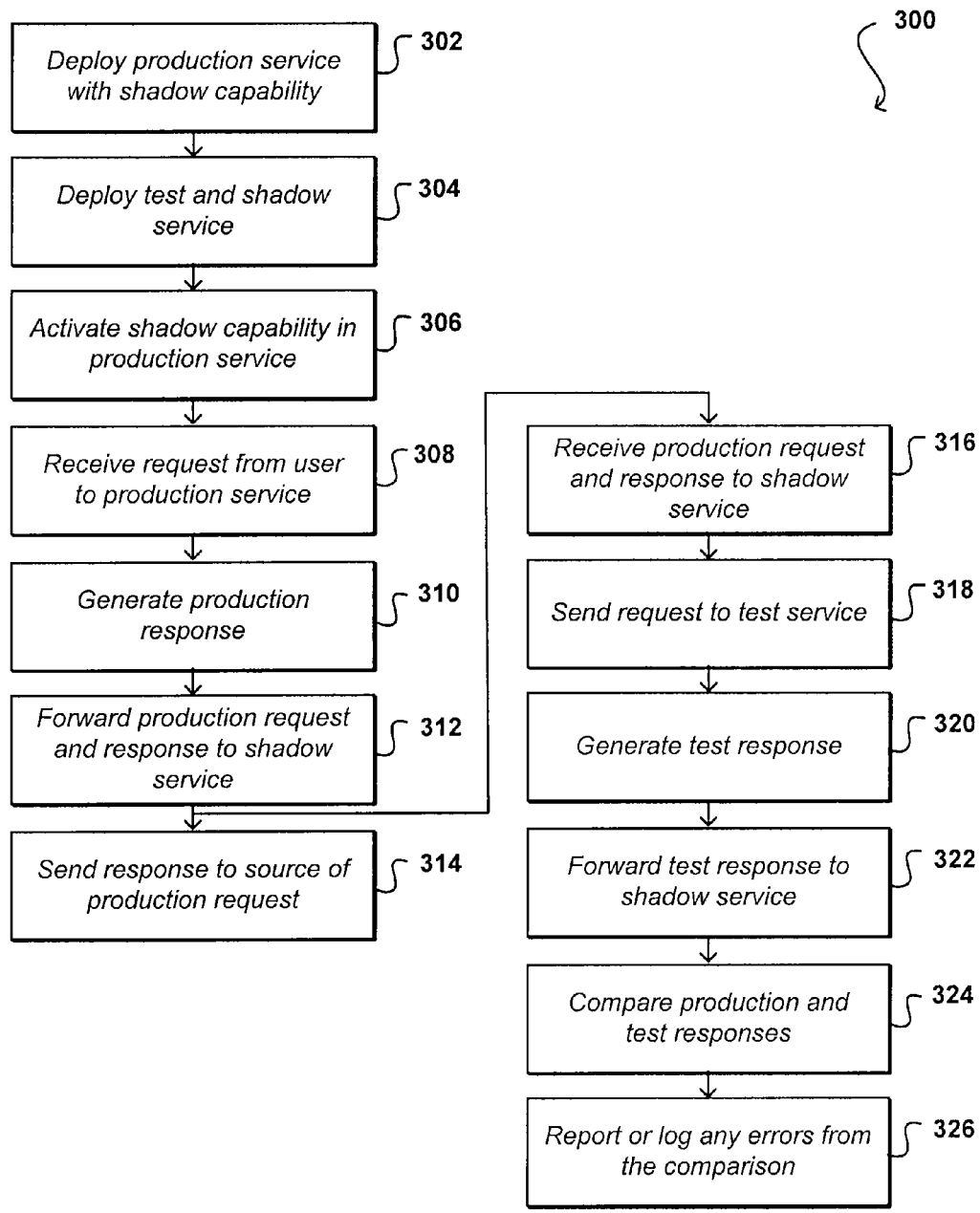
FIG. 3 illustrates steps of a process for testing a service that can be used in accordance with one embodiment.

FIG. 3 illustrates steps of a process 300 for utilizing these components to test a new service in accordance with one embodiment. In this process, a production service is deployed in the production environment which includes what is referred to herein as shadow capability 302. Shadow capability allows the production service to be notified when a new service is to be tested, and activates functionality in the production service to handle and/or route new requests. When a test service and a corresponding shadow service are deployed, activated, etc., 304, a message or other notification can be sent to the production service notifying the production service to activate the shadow functionality 306. It should be understood that the deployment of the testing and shadow service can be independent of the deployment of the production service with shadow capability. For example, the shadow and testing services might be deployed much later than the production service is deployed. If the shadow service is activated in the production service before the test service is deployed, the production service can simply send messages whether the shadow service is there to receive the messages or not. In other embodiments, the shadow service can be deployed before the production service, and will only receive messages from the production service once the production service is deployed and the shadow capability is activated. Other variations apply as well, and the layout of the figure should not be interpreted as implying a necessary order unless otherwise stated. When the production service subsequently receives a production request 308, such as from a user, application, or other service, the production service processes the request per normal operation and generates the appropriate response 310. In addition to sending the response back to the user, application, or other source of the request 314, the production service can forward a copy of the initial request and a copy of the response, generated by the production service for the initial request, to the shadow service 312. In other embodiments, the production service might send a new request to the shadow service that includes at least a portion of the information of the initial request, and may include additional information in a header or body of the request that is useful for testing purposes, such as an identifier of the instance of the service generating the new request. The new request can also include at least a portion of the information of the response, such that a separate copy of the response need not be sent.

In some embodiments, the production service might have a parameter stored locally that causes the production service to only forward a percentage or other number of production requests to the shadow service. In other embodiments, all requests are forwarded to the shadow service, which then selectively forwards requests to the test service. In some embodiments, certain types of requests may be forwarded more or less frequently, as discussed elsewhere herein.

In some embodiments, information from the production request is sent to the shadow service before the production response is sent back to the source of the request, so that the information can be released as soon as the request is sent. In other embodiments, the response to the source is sent first in order to reduce the small amount of latency otherwise introduced by first routing to the shadow service. In other embodiments the requests are sent concurrently, such as by broadcasting the information to the source and the shadow service. The production service can send the request and response over a one-way channel, and will not wait for a response from the test service. As soon as the shadow service receives the copy of the production request, the production service drops the connection and replies to the customer or other source of the request. Such an approach causes substantially no impact to the customer, as a millisecond or similar delay will not be noticeable to a user over a network connection, and there will be no appreciable difference in latency or quality of the response. Further, the production response is the same regardless of the presence of the shadow service.

The shadow service receives the request and corresponding response from the production service 316. In some embodiments, the shadow service is unaware of the sender of the request, and further would not be able to respond along the one-way communication path even if the identity or address of the sender were known. The shadow service is programmed to remove the production response, or information corresponding to the production response, and store the production response information locally, such as in local storage or in cache memory. The shadow service then forwards the initial production request, or at least information corresponding to the initial production request, to the test service 318 as a test request. The test request sent to the test service in various embodiments will take the form of a standard production request, and in some cases may be an exact copy of the initial production request, such that from the test service perspective the test service is getting a production request and will process the request according. Any significant difference between the test request and the production request is removed or filtered by the shadow service, except where a specific test case dictates otherwise, for example.

The test service thus receives information for an actual production request from a customer or other source. The test service is able to process the test request (the copy of the production request) and generate a test response 320. The test service returns the test response to the shadow service 322, just as the test service would if the test service was in production and had received the request directly from the customer. The shadow service having sent the test request is waiting for a response at the end of the test pipeline, and receives the test response from the test service. Since the shadow service has a copy of the production request stored locally, the shadow service is able to compare the production and test responses 324. In one embodiment, the shadow service tests to see if the production and test results match. In some cases, the shadow service will report any detected differences 326. In other cases, the shadow service will report only specific differences, or will not report certain differences. In yet other cases the shadow service will report when there are not expected differences, such as where there was a change between versions that should result in a specific difference. The shadow service can also compare the results in both directions, as some information might not be present in either response. In some embodiments, the results of the comparison are stored in a log for subsequent analysis. In some embodiments, the shadow service also tracks and generates statistics for specific types of error. The log and statistics can be used to help a test team pinpoint specific errors, and determine whether the occurrence frequency is statistically significant, or falls above a threshold that determines whether the error should be analyzed or ignored.

Figure 4:
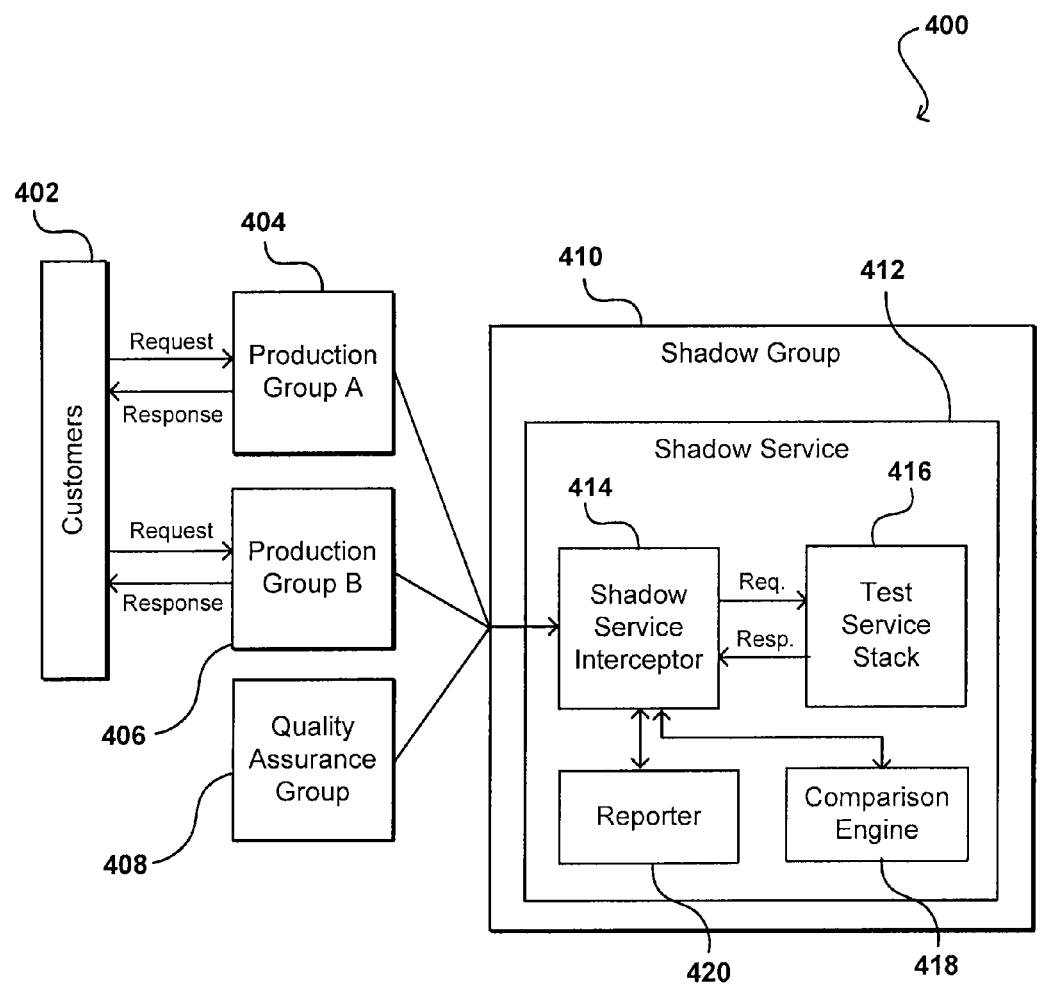
FIG. 4 illustrates a system configuration that can be used in accordance with one embodiment.

FIG. 4 illustrates components of a system 400 that can be used to provide shadow service functionality in accordance with one embodiment. In this example, two different production groups 404, 406, or groups offering the production service, are able to receive requests from various customers 402, process those requests, and send the appropriate responses back to the customers. The production services for both groups also are able to send copies of the requests received from the customers, as well as copies of the responses sent back to those customers, to a shadow group 410 that is operating the shadow service 412. As used herein, the term "group" can refer to any appropriate association, such as a farm of servers, a set of modules owned by a specific group or division within an organization, etc. In addition to the groups operating the production services, a testing group 408, such as a quality assurance group, also is able to submit specific requests and expected responses to the shadow service 412. Such an approach allows specific functionality to be tested as is discussed later herein.

As shown in the figure, a shadow service in this embodiment includes two primary components. A first component is an interceptor 414 operable to capture the production or "expected" response on the input flow, and compare the expected response with the actual test response on the output flow from the test service. The shadow service also includes a test service stack 416 operable to communicate with the appropriate test service (not shown in this figure) and act as a customer to the test service. The interceptor component can include a comparison module that is able to compare or contrast the expected and actual responses. In a Web services environment, for example, the responses can be in the form of extensible markup language (XML) documents, and the interceptor can include a comparison module such as an XML difference detecting engine ("DiffEngine"), which in one embodiment is a stand-alone Java package with a configurable assert and/or report plug-in for custom use cases.

Each production service can be deployed with a shadow service routing algorithm that enables the production service to route appropriate requests to the shadow service. In some embodiments, the service routing algorithms can be configurable or otherwise allow for the selecting of a ratio, percentage, fixed number, or other selected subset of requests to be routed to the shadow service. For example, each server hosting a production service can have a parameter set that causes one out of every one hundred requests to be routed to the shadow service. Each server can keep a local count without needing any information about the load on the other servers. The algorithm can also be more complex, and can include parameters or settings allowing for specific types of requests to be routed more often, less often, or not at all. The number of requests routed can also depend on other factors, such as data for the request, a sender of the request, session information, etc. Further, if some types of requests are infrequent or of particular importance, then a higher number or even all of those requests can be routed to the shadow service. By selecting a random or semi-random sampling of the requests, the test service can be tested using production data without having to replicate and maintain a full copy of the production environment, including components such as a large number of servers, etc. For example, the number of hosts can be scaled down accordingly. A balance can be determined, as a greater sampling can improve accuracy, but also comes at a higher cost. In order to compensate for smaller server fleets, for example, a testing period can be extended to accrue more data.

Each request can arrive at the shadow interceptor 412 on an individual thread. The shadow interceptor removes the expected response and passes the request to the lower-level interceptors on the test service. When the test service receives the request, the request looks like a request from the customer or client side. The request goes to the test stack 416, which is the part of the test service. When the test service processes the request and sends back a response, the shadow interceptor has both responses for the request and can compare the responses as discussed elsewhere herein. In some embodiments the shadow service can actually attempt to reply to the customer, but because the router is one way there is no one listening for the response. When the service goes into production, however, the shadow service layer is disabled and the new service performs just as the service performed during testing.

As discussed above, in order to compare the production and test (or expected and actual) responses, the shadow interceptor can call a comparison element such as a comparison engine 418. The comparison engine can be part of the interceptor, part of the shadow service, or external to both. The interceptor also can call a reporting element 420, which can be registered with the comparison engine. The shadow service can have a dedicated error reporter, which can perform functions such as collecting and storing statistics. The shadow service also can register a custom asserter in the interceptor. The comparison engine thus is essentially a framework for utilizing components such as an asserter, reporter, etc., as controlled by the interceptor. Such a framework helps the interceptor to ensure that the proper asserter is registered, as well as other functions.

As discussed, not only can there be a large number of responses generated for a service in a small amount of time, but each response itself can be quite large. In some cases, a response can be over one megabyte of text. In such cases, it can be important to select a comparison engine that is able to quickly determine differences in responses.

When analyzing differences, it can be important to understand that not all discrepancies are important in any given situation. For example a request identifier can be different for each response, but such a difference likely is expected and is not indicative of the performance of the service. Thus, it may not be worthwhile to compare the identifiers. Further, elements such as carriage returns would be returned by many comparison engines as differences, but in many cases such differences are inconsequential and simply make it more time consuming to locate and determine important differences for a service. Further, not all comparison is about equality. A new version of a service might reflect changes that should produce different results than the current version, and in such a case it can be desirable that the comparison engine be configurable to validate the expected discrepancy accordingly. The expected difference can be simple or complex, and the comparison engine can be flexible enough to accommodate these use cases while maintaining accuracy. In a Web services example using responses in the form of XML documents, the XML comparison can be tricky since XML is structure sensitive but not necessarily order sensitive. Further, the comparison engine in some embodiments should be sufficiently efficient even though the engine is not serving customers. If the comparison engine is taking too much processor time to execute the comparison, service performance, scalability, or other such characteristics can be skewed accordingly. It also can be desirable for a comparison engine to be able to distinguish transient problems from real problems. As used herein, a transient problem is a type of problem that will self correct within a reasonable amount of time, such as a network glitch, stale cache, etc. Such problems can be difficult to reproduce and could therefore distract significant development resources.

A comparison engine in accordance with one embodiment is able to quickly determine and analyze relevant differences in a structured document or file, such as an XML document. As mentioned, an XML document is based on a structure-aware template that allows the order of elements in the hierarchy to change between instances. Many existing comparison engines would report the differences in structure as a difference, but a comparison engine in accordance with one embodiment is able to compare the structures and determine whether any variations in the structure are relevant or are simply a result of the nature of the XML structure. Further, a comparison engine can analyze an XML document down to the element level, which for many comparison engines is difficult and takes a substantial amount of time when the tree is sufficiently large. A comparison engine can provide a finite control, able to associate customization logic for comparing nodes in an XML tree. A default asserter can be defined and/or configured in order to customize comparison results down to the node level. For example, a user might define a case-insensitive asserter for a specific element if a new service will always report that element in uppercase, while at least one service can report that element in lower case or a combination of upper and lower case. A comparison engine can also compare simple and complex types.

A comparison engine in accordance with one embodiment is able to distinguish transient differences from actual or important differences using a component such as a statistic analyzer. A statistic analyzer can filter out statistically insignificant errors, such as transient errors. If, on the other hand, a transient error is determined to be significant, the transient error can be reported by the comparison engine. In one embodiment, the statistic analyzer is registered with the comparison engine as a reporting plug-in. The analyzer is able to track the error count of each discrepancy, and can perform functions such as ranking at least the top errors and periodically logging at least the top errors.

Figure 5:
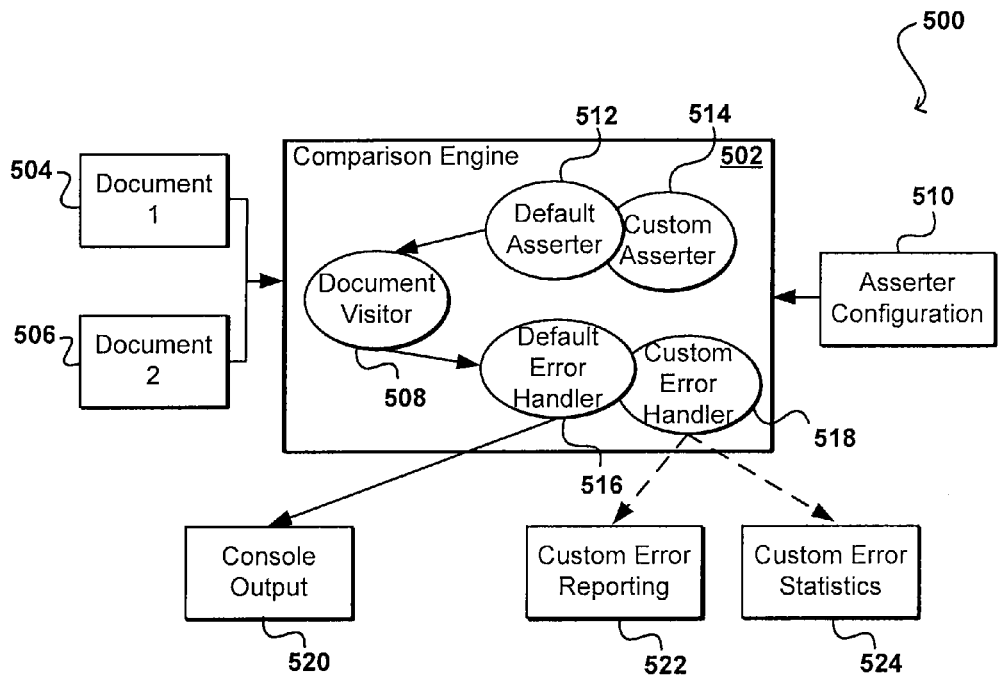
FIG. 5 illustrates an implementation of a comparison engine that can be used in accordance with one embodiment.

FIG. 5 illustrates a configuration 500 for implementing a comparison engine 502 in accordance with one embodiment. The comparison engine 502 provides a framework and default implementation useful for comparing documents 504, 506, including complex or variable structure documents such as XML documents. As shown, this comparison engine includes a component referred to herein as a document visitor 508, or document traversing component, which is configured to traverse the first or "expected" document 504 and locate possible matches from the second or "actual" document 506. A document visitor is a component or module able to traverse the "expected" document, node by node, and search for the corresponding "actual" element, such as by using an XPath built for the target node. There might be multiple matches in such a process, which each can be validated and/or asserted accordingly.

The comparison engine can have at least one default asserter 512. A user can specify asserter configuration information 510 in order to define at least one custom asserter 514 able to apply customizable asserter rules. Once the document visitor 508 locates a possible match, the document visitor locates and invokes the proper asserter, which can be either the default asserter 512 or custom asserter 514. When an assertion error between the documents is detected, the document visitor 508 can locate and invoke an appropriate error handler component, such as a default error handler 516 or customer error handler 518 able to provide customizable error reporting. For example, a default error handler 516 might generate standard console output 520 upon detection of an error. A customer error handler 518, on the other hand, might generate a custom error report 522 and/or custom error statistics 524 depending upon the configuration from the user. A comparison engine can be configured to invoke error reporting at the most precise point of detection, once and only once for a given error. All error reporters can be configured to utilize a single assert error report interface.

An asserter of the configuration engine can be used to determine whether the "expected" and "actual" elements match. In an implementation in accordance with one embodiment, there are at least three application programming interfaces (APIs) that an asserter can implement:
    assertEquals(Expected, actual)—for leaf element comparison,
    assertMissing(expected)—if no corresponding actual element can be located, this method will be invoked, and
    assertStructure(expected, actual, childrenResults)—allows the asserter to determine the structural integrity based on each children assertion result. This can be invoked for a complex node, such as a node with sub-elements.

The comparison engine then can provide the default asserter with the following implementation, for example:
    assertEquals (for simple nodes)—asserts context ignoring white space
    difference.assertMissing (for all nodes)—will always report error
    error.assertStructure: (for complex nodes)—only returns an error when no "actual" node match is found. The engine may only suggest matching node(s) when all children match.

Custom asserters can be registered in the configuration engine for a specific version and a specific element, for example. The adopting system or user can provide an asserter configuration file to customize the engine. If no custom asserter is found for the given key pair, the default asserter can be used. The following is an example of an asserter configuration:

```
<asserters>
  <asserter>
    <version>all</version>
    <xpath>//RequestId</xpath>
    <class>com.aws.ecscommons.xmldiff.asserter.IgnoreAsserter</class>
  </asserter>
  <asserter>
    <version>2008-06-22</version>
```

```
    <xpath>//RequestProcessingTime</xpath>
    <class>com.aws.ecscommons.xmldiff.asserter.IgnoreAsserter
    </class>
  </asserter>
<asserters>
```

A configuration engine in accordance with one embodiment can be embedded in any appropriate process or application, without making any assumption of assertion rules or error reporting format. The logic instead is determined by the registered asserters and/or error handlers. Such an implementation allows the engine implementation to be relatively simple while allowing various systems to adopt the engine for specific assertion precision, tolerance, and reporting functionality. As discussed, such an engine can provide a set of default implementations for asserters and error handlers such that the engine can work without additional customization, allowing adopting systems to gradually tune the assertion precision over time.

Figures 6A, 6B:
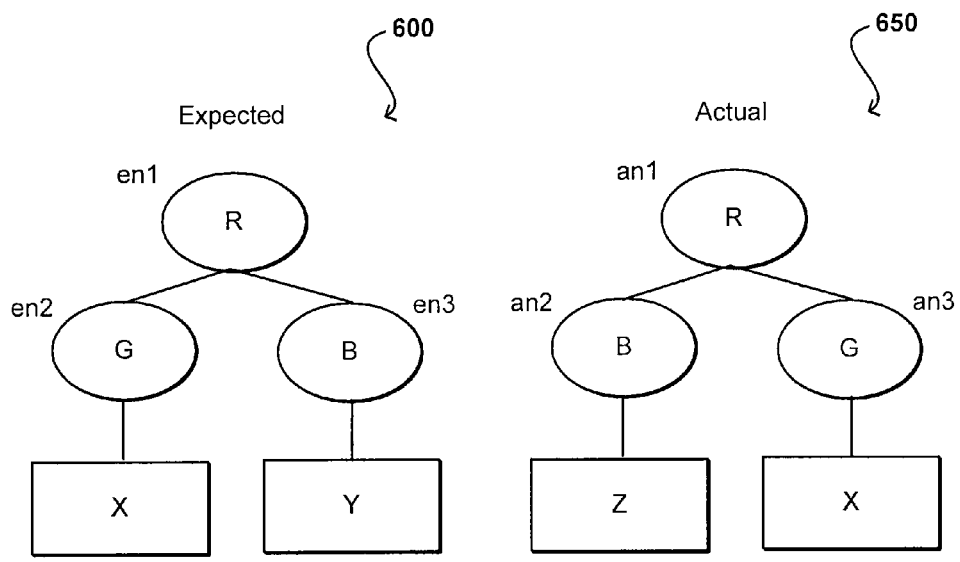
FIGS. 6(*a*) and 6(*b*) illustrate portions of expected and actual documents that can be compared using a comparison engine in accordance with one embodiment.

For each document comparison, the engine can provide both the expected and actual results. For example, FIG. 6(*a*) illustrates an expected structure 600 and FIG. 6(*b*) illustrates a corresponding actual structure 650. As shown, the expected structure 600 includes a hierarchy of three expected nodes, with a first expected node (en1) being a parent of two expected child nodes (en2 and en3). Each child node then has an associated expected value. The actual structure 650 contains generally the same overall structure, but it can be seen that actual nodes 2 and 3 (an2 and an3) are "flipped" in the actual tree with respect to the expected tree. The comparison engine is able to detect this difference and, unless the error is significant, may not report the error as nodes "B" and "G" are children of node "R" in both structures (which further may be specified by the customer asserter rules). Also, in both structures node G has a value of "X". Node B, however, has a value of "Y" in the expected structure, and a value of "Z" in the actual structure. In this case, the comparison engine could report that the actual value of node B is not the same as the expected value of node B. As discussed, in some cases this difference might be expected. If the appropriate custom asserter rule specifies that this difference is expected, then there may be no error detected in the two documents. Traditional comparison engines could have reported several differences between the two documents as discussed above.

Differences also can exist between default and custom error reporting. For FIGS. 6(*a*) and 6(*b*), for example, an engine with only a default asserter and error handler without any customization might report that these documents do not match, caused by the differences of node/R/B: expected="Y", actual="Z", as discussed. The report then could look something like the following:

| Visiting Expected Node | xpath | Matched Actual Node | Asserter | ErrorReport |
|---|---|---|---|---|
| en1 (not leaf) | /R | an1 | assertEquals(en1, an1) | reportError(...) |
| \|---en2 (leaf) | /R/G | an3 | assertEquals("X", "X") | no-error |
| \|---en3 (leaf) | /R/B | an2 | assertEquals("Y", "Z") | reportError(...) |

Invoking a default asserter, which can implement an XML asserter interface, for example, may simply compare the content, detecting the difference for node "en3" and throwing an assertion exception. The exception then triggers the default error reporting console output module, which can implement a default assert error report, for example.

The user, however, may have specified a custom asserter to ignore the difference in node en3. In this example, the comparison engine registers a custom Asserter "IgnoreAsserter":

| version | xpath | asserter |
|---|---|---|
| * | /R/B | IgnoreAsstererer |

```
public class IgnoreAsserter implements XmlAsserter {
  public void assertEquals(Node expected, Node actual)
    throws
    AssertException {
  return;
  }
}
```

The comparison engine then can report that these two documents match, such as by the following:

| Visiting Expected Node | xpath | Matched Actual Node | Asserter | ErrorReport |
|---|---|---|---|---|
| en1 (not leaf) | /R | an1 | assertEquals(en1, an1) | no-error |
| \|---en2 (leaf) | /R/G | an3 | assertEquals("X", "X") | no-error |
| \|---en3 (leaf) | /R/B | an2 | assertEquals("Y", "Z") | no-error |

In another example, the comparison engine can invoke a default asserter but can call a custom error report which tracks error statistics. The engine can register a custom error report such as by the following:

```
public class ErrorStatisticTracker implements AssertErrorReport {
  // the map keeps track of the error count for the given xpath.
  HashMap<String, Integer>errorCounts=new HashMap<String,
    Integer>( );
  public void reportError(AssertException ex) {
    Integer count=errorMap.get(ex.getXpath( ));
    errorMap.put(ex.getXpath( ) count+1);
  }
  ...
}
...
engine.addErrorReport(new ErrorStatisticTracker( ));
```

A comparison engine in accordance with one embodiment is further configured to perform a two-way comparison between the documents, first comparing the expected to the actual, and then comparing the actual to the expected. This is not trivial, as there might be nodes or values in one document that are not contained in another. If a comparison engine is only looking to see if each expected value has a matching actual value, then the engine may not be able to determine whether each actual value also has a matching expected value, and vice versa. A comparison engine in accordance with one embodiment performs the comparison in both directions, and upon locating any missing or mismatched information, can report the element(s) where the difference is located, such as by providing an XPath reference to the element. In some embodiments, the bi-directional approach is configurable, as a user might only want to check to see that all expected values are in the actual structure for purposes of backwards compatibility, and may not care about the inverse comparison.

Figure 7:
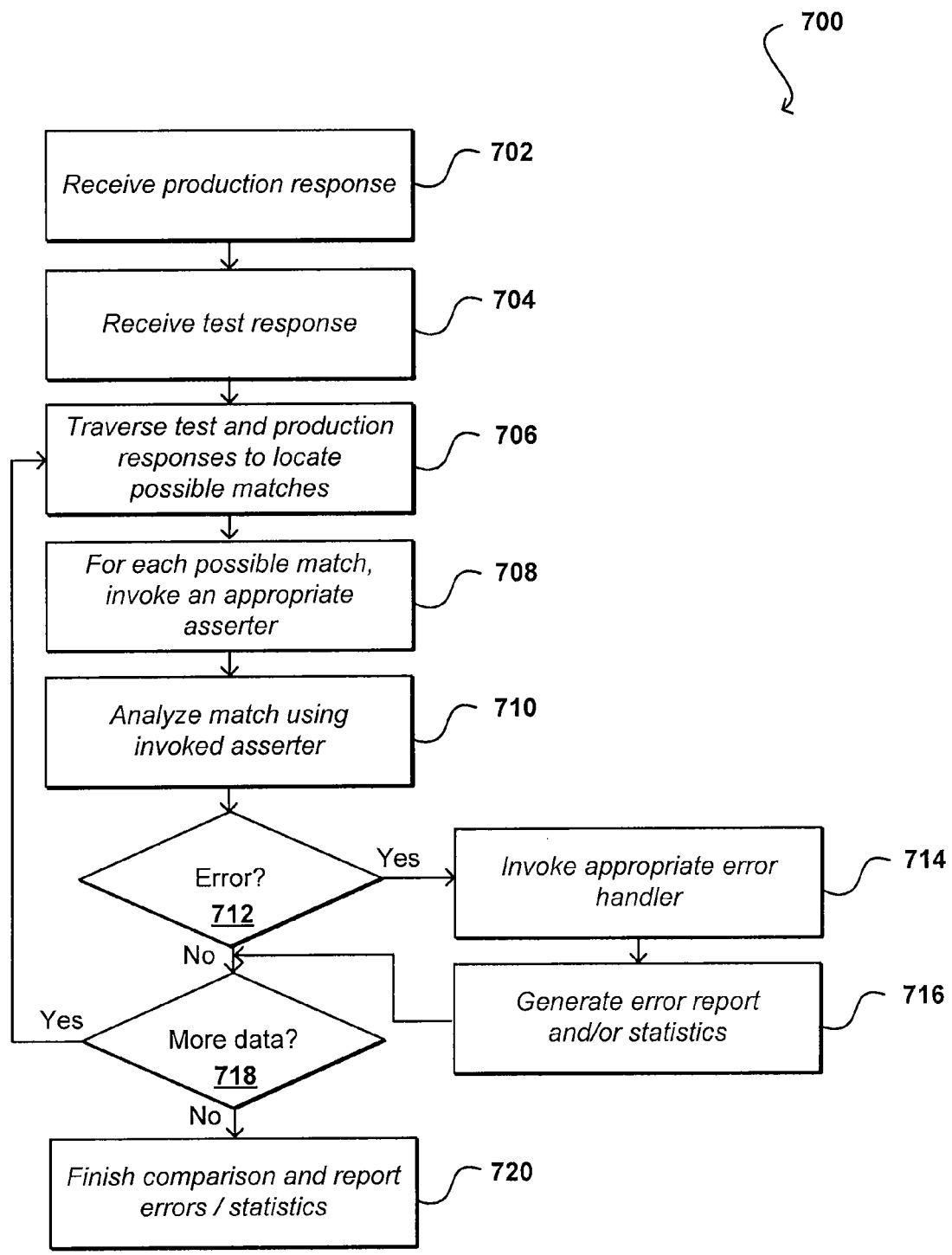
FIG. 7 illustrates steps of a process for comparing documents that can be used in accordance with one embodiment.

FIG. 7 illustrates a general approach 700 to comparing documents using a comparison engine that can be used in accordance with one embodiment. In this example, a production response is received from the production service 702, and a test response is received from a test service 704. If the responses are received to a shadow service, information from the responses can be submitted to the comparison engine. The comparison engine then traverses the production and test responses to determine possible matches 706. As discussed above, this can be a one-way (in either direction) or two-way comparison. For each possible match detected by the comparison engine, an appropriate asserter is invoked 708. As discussed, this can be a default asserter or any appropriate custom asserter defined by a user. The match is analyzed by the invoked asserter 710. If an error is determined 712, then an appropriate error handler is invoked 714 and an error report and/or error statistics are generated 716. If there is more data to compare 718, the process continues until the comparison is finished and the results can be reported 720.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of testing a service, comprising:
   under the control of one or more computer systems configured with executable instructions, receiving a production request to a production service and generating a production response;

transmitting information in the production request and the production response from the production service to a shadow service;

forwarding information in the production request from the shadow service to a test service as a test request;

receiving a test response from the test service to the shadow service in response to the test request;

performing a two-way comparison of the production response and test response using a comparison engine able to distinguish between significant and insignificant differences so as to determine any differences between the production response and test response by determining values in the production response that are missing in the test response and values in the test response that are missing in the production response, and detecting differences between matching values in the production response and the test response;

determining whether any determined differences constitute significant differences between the production response and test response; and generating statistics for the significant differences, wherein the statistics are collected for multiple production requests, and wherein the collected statistics are indicative of potential errors in the production or test service.

2. A method according to claim 1, further comprising:
generating a report containing any significant differences between the production response and test response.

3. A method according to claim 1, further comprising:
forwarding the production response from the production service to the source of the production request.

4. A computer-implemented method of testing a service, comprising:

under the control of one or more computer systems configured with executable instructions, receiving a first request and a first response from a first service, the first response being generated by the first service in response to the first request;

forwarding information in the first request to a second service;

receiving a second response from the second service;

performing a two-way comparison of the first and second responses in order to determine any differences between the first and second responses by determining values in the first response that are missing in the second response, values in the second response that are missing in the first response, and detecting differences between matching values in the first response and the second response; and analyzing the determined differences to locate potential errors in the first or second service.

5. A method according to claim 4, wherein:
comparing the first and second responses includes forwarding information in the first and second responses to a comparison engine.

6. A method according to claim 4, further comprising:
enabling a user to define rules for determining differences between the first and second responses.

7. A method according to claim 6, wherein:
the rules for determining differences can include rules for distinguishing significant and insignificant differences.

8. A method according to claim 4, further comprising:
generating statistics for the significant differences, the statistics useful in locating errors in the first or second service.

9. A method according to claim 4, further comprising:
recording the differences to a log; and
ranking the recorded differences.

10. A method according to claim 4, further comprising:
notifying the first service when the first service is to forward the information in order to test the second service.

11. A method according to claim 4, wherein:
the first service is a production service able to receive requests from a user; and
the second service is a test service able to process the requests from the user when forwarded by the production service.

12. A method according to claim 4, further comprising:
receiving a plurality of requests; and
selecting a subset of the plurality of requests to be forwarded to the second service.

13. A method according to claim 4, further comprising:
specifying at least one aspect of the plurality of requests to be used in selecting a subset of the plurality of requests to be forwarded to the second service.

14. A method according to claim 12, further comprising:
receiving additional first requests and first responses from additional instances of the first service.

15. A method according to claim 4, wherein:
the first and second responses are structured language documents; and
comparing the first and second responses includes traversing the structure of each structured language document down to an element level.

16. A method according to claim 4, further comprising:
configuring a custom reporting module in order to report specific differences between the first and second responses.

17. A computer-implemented method of testing a new version of a service, comprising:

under the control of one or more computer systems configured with executable instructions, receiving a production request and a production response from a first version of a service in production, the production response being generated by the first version of the service in response to the production request;

forwarding information in the production request to a second version of the service to be tested;

receiving a test response from the second version of the service;

performing a two-way comparison of the production and test responses in order to determine any differences between the production and test responses so as to indicate potential differences between the first and second versions of the service by determining values in the production response that are missing in the test response, values in the test response that are missing in the production response, and detecting differences between matching values in the production response and the test response; and analyzing the determined differences to locate potential errors in the first or second version of the service that might cause the second version to be at least partially incompatible with the first version of the service.

18. A system for testing a service, comprising:
a processor; and
a memory device including instructions that, when executed by the processor, cause the processor to:
receive a first request and a first response from a first service, the first response being generated by the first service in response to the first request;

forward information in the first request to a second service;

receive a second response from the second service;

perform a two-way comparison of the first and second responses in order to determine any differences between the first and second responses by determining values in the first response that are missing in the second response, values in the second response that are missing in the first response, and detecting differences between matching values in the first response and the second response; and analyze the determined differences to locate potential errors in the first or second service.

19. A system according to claim 18, wherein the memory device further includes instructions that, when executed by the processor, cause the processor to:

enable a user to define rules for determining differences between the first and second responses.

20. A system according to claim 18, wherein the memory device further includes instructions that, when executed by the processor, cause the processor to:

generate statistics for the significant differences, the statistics useful in locating errors in the first or second service.

21. A system according to claim 18, wherein the memory device further includes instructions that, when executed by the processor, cause the processor to:

record the differences to a log; and rank the recorded differences.

22. A computer program product embedded in a non-transitory computer readable storage medium for testing a service, comprising:

program code for receiving a first request and a first response from a first service, the first response being generated by the first service in response to the first request;

program code for forwarding information in the first request to a second service according to specified forwarding criteria;

program code for receiving a second response from the second service;

program code for performing a two-way comparison of the first and second responses in order to determine any differences between the first and second responses by determining values in the first response that are missing in the second response, values in the second response that are missing in the first response, and detecting differences between matching values in the first response and the second response; and program code for analyzing the determined differences to locate potential errors in the first or second service.

23. A computer program product according to claim 22, further comprising:

program code for enabling a user to define rules for determining differences between the first and second responses.

24. A computer program product according to claim 22, further comprising:

program code for generating statistics for the significant differences, the statistics useful in locating errors in the first or second service.

25. A computer program product according to claim 22, further comprising:

program code for recording the differences to a log; and program code for ranking the recorded differences.

* * * * *